(12) United States Patent
Lin et al.

(10) Patent No.: US 11,692,307 B2
(45) Date of Patent: Jul. 4, 2023

(54) METHOD FOR PREPARING NOVEL WATERBORNE POLYURETHANE FOAM LAYER FOR SYNTHETIC LEATHER

(71) Applicant: SICHUAN UNIVERSITY, Chengdu (CN)

(72) Inventors: Wei Lin, Chengdu (CN); Jianhui Wu, Chengdu (CN); To Ngai, Hong Kong (CN); Chunhua Wang, Chengdu (CN); Long Zhang, Chengdu (CN)

(73) Assignee: SICHUAN UNIVERSITY, Chengdu (CN)

( * ) Notice: Subject to any disclaimer, the term of this patent is extended or adjusted under 35 U.S.C. 154(b) by 157 days.

(21) Appl. No.: 17/474,143

(22) Filed: Sep. 14, 2021

(65) Prior Publication Data

US 2022/0186429 A1 Jun. 16, 2022

(30) Foreign Application Priority Data

Dec. 11, 2020 (CN) .......................... 202011443877.X

(51) Int. Cl.
| | |
|---|---|
| *D06N 3/14* | (2006.01) |
| *D06N 3/00* | (2006.01) |
| *B01J 31/22* | (2006.01) |
| *B82Y 30/00* | (2011.01) |
| *B82Y 40/00* | (2011.01) |

(52) U.S. Cl.
CPC ............... *D06N 3/14* (2013.01); *D06N 3/005* (2013.01); *B01J 31/2213* (2013.01); *B82Y 30/00* (2013.01); *B82Y 40/00* (2013.01); *D06N 2211/28* (2013.01)

(58) Field of Classification Search
CPC ...... D06N 3/14; D06N 3/005; D06N 2211/28; B01J 31/2213; B82Y 30/00; B82Y 40/00
See application file for complete search history.

(56) References Cited

U.S. PATENT DOCUMENTS

2017/0027168 A1* 2/2017 Heath ...................... C08L 1/02

FOREIGN PATENT DOCUMENTS

| CN | 111019507 A | * | 4/2020 | ............. C08G 18/12 |
| CN | 111072903 A | * | 4/2020 | ............. C08G 18/36 |

OTHER PUBLICATIONS

English translation to CN-111072903-A to Zhao et al. obtained from PE2E database (Year: 2020).*
English translation to CN-111019507-A to Zhang et al. obtained from PE2E database (Year: 2020).*

* cited by examiner

*Primary Examiner* — Jeremy R Pierce
(74) *Attorney, Agent, or Firm* — Hoffmann & Baron, LLP; Linda Chin

(57) ABSTRACT

A method for preparing a novel waterborne polyurethane foam layer for synthetic leather is disclosed. The method includes first preparing a charged cellulose nanofiber by using a wood pulp as a raw material; meanwhile, subjecting a polyisocyanate, a macromolecular diol, a hydrophilic chain extender and a small molecular chain extender to a polyaddition reaction and an acid-base neutralization reaction in sequence, to obtain a cationic or anionic waterborne polyurethane; adding the charged cellulose nanofiber and a certain amount of a crosslinking agent to the oppositely charged ionic waterborne polyurethane emulsion, stirring the resulting mixture, forming a bimolecular layer at the gas/liquid interface by a self-assembly of the cellulose nanofiber and waterborne polyurethane nanoparticles through electrostatic interactions to obtain a stable Pickering foam; using the stable Pickering foam as a template, drying and solidifying to obtain the waterborne polyurethane foam layer for synthetic leather.

5 Claims, No Drawings

METHOD FOR PREPARING NOVEL WATERBORNE POLYURETHANE FOAM LAYER FOR SYNTHETIC LEATHER

CROSS REFERENCE TO RELATED APPLICATION(S)

This patent application claims the benefit and priority of Chinese Patent Application No. 202011443877.X filed on Dec. 11, 2020, the disclosure of which is incorporated by reference herein in its entirety for all purposes as part of the present application.

TECHNICAL FIELD

The present disclosure relates to the field of synthetic leather manufacture, and more particularly to a method for preparing a waterborne polyurethane foam layer for synthetic leather.

BACKGROUND ART

China is a major producer of synthetic leather, and according to statistics, the production of synthetic leather in 2018 reached 7 billion square meters, accounting for 70% of the world's total amount, and by 2027, it will continue to grow at an annual growth rate of 7% every year. The main reasons mainly lie in the following three points: 1. People have enhanced animal protection awareness, forcing companies to look for alternatives to real leather. For example, Tesla began to use synthetic leather instead of real leather as car interiors in 2016, and completed the "de-animalization" of all car leather by the end of this year. 2. Compared with the real leather, the price of synthetic leather is lower. 3. More importantly, the properties of synthetic leather, such as breathability, moisture permeability, external feel, and hand feel, are close to those of real leather, making it an ideal substitute for real leather.

However, the solvent-based polyurethane resin was commonly used by the traditional synthetic leather companies mainly with wet and dry manufacturing process. The volatilization of organic solvents in the slurry not only makes economic suffering, but also causes serious pollution to the environment. If the solid content of the solvent-based polyurethane used in the wet process is around 17%, a large quantity of organic solvent N,N-dimethylformamide (DMF) is required. Although the current rectification technology could recover 98% DMF, the amount of DMF discharged out of order is still quite large due to a large quantity of DMF used. While the solvent used in the dry process is mostly a mixture of several solvents such as DMF, butanone, acetates, toluene, and formaldehyde, etc., which brings a lot of difficulties to the solvent recovery, and results in a final recovery rate of only 50%. It is estimated that the synthetic leather industry needs about 3.4 million tons of solvents per year, of which at least 1-1.5 million tons of solvents are discharged disorderly. The economic loss caused by disorderly discharge of 1 million tons could reach 12 billion yuan when 1.2 thousand yuan is calculated for per ton solvent. More importantly, with the improvement of living standards, higher requirements for the ecological nature of leather products have been put forward. EU REACH regulations stipulate that synthetic leather products such as clothing leather, automotive interior leather and furniture leather are free of azo, formaldehyde and heavy metals, and the content of the volatile organic solvent (VOC) is limited to 5 mg/kg or less. Therefore, whether from the perspective of environment, cost or an external export, it is difficult for traditional solvent-based polyurethane synthetic leather manufacturing process to meet the corresponding requirements.

It is an ideal solution to solve the above problems from the source that waterborne polyurethane is used instead of solvent-based polyurethane to produce an ecological synthetic leather. Waterborne polyurethane is a polyurethane emulsion using water as a solvent, in order to make the polyurethane be uniformly dispersed in water, a certain number of hydrophilic groups is needed to be introduced in its structure. According to different hydrophilic groups, waterborne polyurethanes could be divided into three types: anionic type (carboxyl, sulfonic acid group), cationic type (quaternary ammonium salt) and non-ionic type (polyethylene glycol). At present, the most commonly used in the synthetic field is the anionic waterborne polyurethane, followed by cationic waterborne polyurethane, and non-ionic waterborne polyurethane is less used. The coating formed by directly applying waterborne polyurethane onto the base fabric is relatively flat, thin and dense, and could not achieve the air and moisture permeability, a good hand feel and fullness similar to real leather. Applying a layer of waterborne polyurethane foam layer with a porous structure onto the surface of the base fabric is an effective way to solve the above problems. At present, the commonly used foaming methods mainly include chemical foaming and physical foaming, and the chemical foaming method mainly utilizes a foaming agent to decompose and release a large amount of gas at a high temperature, thereby promoting the polyurethane matrix to foam. However, most of the foaming agents used are organics that are insoluble in water and the foaming temperature is high, generally more than 200° C., so the chemical foaming method is not applicable for the waterborne polyurethane system. In physical foaming methods, gas has been introduced into the polyurethane matrix by a vigorous mechanical agitation, and then the polyurethane foam has been obtained under the action of a foam stabilizer and a foam leveling agent, etc., which is also a method used in current industrial waterborne polyurethane foaming. However, for this method, the process requirements are very high, the cost is too large, and the requirement for the solid content of the waterborne polyurethane is more than 50%. Moreover, the stability and pore size uniformity of the obtained foam need to be further improved. Therefore, the preparation of the foaming layer has always been the key technique that restricts the development of waterborne polyurethane synthetic leather.

Pickering foam is a kind of foam formed by solid particles with specific wetability adsorbed on the gas-liquid interface, which exhibits good foam stability and pore size uniformity, and the pore size of which could also be adjusted by changing the surface wetability and concentration of the solid particles. Therefore, the use of Pickering foam as a template to prepare porous foam materials has gradually attracted widespread attention. For example, To Ngai et al. used a Pickering foam synergistically stabilized by hydrophobic silica nanoparticles and hydrophilic polymers such as zein and poly(N-isopropylacrylamide) as a template, cross-linked and solidified the structure by adding a cross-linking agent (such as glutaraldehyde) to the continuous phase, and dried the solidified product at ambient temperature, to obtain porous lightweight materials. Studies showed that such materials have potential prospect in 3D printing and mold molding (Sheng, Y.; Lin, K.; Binks, B. P.; Ngai, T., Ultra-stable aqueous foams induced by interfacial co-assembly of highly hydrophobic particles and hydrophilic polymer. Journal of Colloid and Interface Sciences 2020, 579, 628-636.).

Studies have shown that compared with spherical stabilizers such as silica, nanofibers with a certain length-diameter ratio will form a three-dimensional network structure that intersects each other. Therefore, a more stable foam could be prepared by using nanofibers as a stabilizer. Meanwhile, the three-dimensional network itself is also a porous structure, so the Pickering foam stabilized with nanofibers is an ideal template for preparing waterborne polyurethane foam layers for synthetic leather.

Cellulose is a macromolecular polysaccharide formed from the D-glucose units linked through β-1,4 glycosidized bonds, which is the most abundant natural organic polymer on earth. Due to its advantages of widely available, low in price, green and environmentally friendly, and excellent mechanical properties, it has been widely used in the field of synthetic leather, and has been commonly used as a filler to be mixed with polyurethane resin, to reduce production costs and improve mechanical properties. Cellulose nanofibers prepared by using cellulose as the raw material are nanofiber materials having a diameter of 3-50 nm, a length of several microns, and a length-diameter ratio of more than 50, and exhibiting the advantages of high elastic modulus (130-150 GPa), high strength (2-6 GPa), good biodegradability and low thermal expansion coefficient (4-6 ppm·$k^{-1}$), etc. According to the different charges, cellulose nanofibers could be divided into two types: cationic nanofibers and anionic nanofibers, which could self-assemble with other oppositely-charged particles at the gas-liquid interface through electrostatic interactions to form a double layer to obtain a stable Pickering foam. For example, Lars Wågberg et al. used quaternary ammonium salt-modified cellulose nanofibers and indomethacin containing carboxyl anions to synergically stabilize and prepare an ultra-stable Pickering foam (Löbmann, K.; Wohlert, J.; Müllertz, A.; Wågberg, L.; Svagan, A. J., Cellulose Nanopaper and Nanofoam for Patient-Tailored Drug Delivery. *Advanced Materials Interfaces* 2017, 4 (9), 1600655.). Similarly, the waterborne polyurethanes used in the field of synthetic leather are all charged ionic nanoparticles. In theory, these ionic polyurethanes could self-assemble to form bilayers at the gas-liquid interface with oppositely-charged cellulose nanofibers through electrostatic interactions, thereby obtaining a Pickering foam synergistically stabilized.

SUMMARY

The present disclosure discloses a method for preparing a waterborne polyurethane foam layer for synthetic leather. First a charged cellulose nanofiber is prepared by using a wood pulp as a raw material, and meanwhile, a polyisocyanate, a macromolecular diol, a hydrophilic chain extender, and a small molecular chain extender are subjected to a polyaddition reaction and an acid-base neutralization reaction in sequence to obtain a cationic or anionic waterborne polyurethane. The charged cellulose nanofibers and a certain amount of a crosslinking agent are then added to the ionic waterborne polyurethane dispersion with an opposite charge. They are then stirred rapidly, and a bimolecular layer is formed at the gas/liquid interface by a self-assembly of the cellulose nanofiber and waterborne polyurethane nanoparticles through electrostatic interactions, to obtain a stable Pickering foam. The stable Pickering foam is used as a template, and dried and solidified to obtain the waterborne polyurethane foam layer for synthetic leather. The specific method comprises steps of (1) Preparation of a Charged Cellulose Nanofiber I. Preparation of a Negatively Charged Cellulose Nanofiber mixing 100 parts by mass of a pulp containing 60% by mass of a wood pulp fiber, 1-10 parts of 2,2,6,6-tetramethylpiperidin-1-oxyl (TEMPO), and 10-60 parts by mass of NaBr to be uniform, adding 20-120 parts by mass of a solution of sodium hypochlorite with a mass fraction of 37% while stirring, and subjecting the resulting mixture to an oxidation reaction at a pH value of 8-10; after the completion of the reaction, centrifugating the resulting product mixture to obtain a supernatant solution, subjecting the supernatant solution to a dialysis, and freeze-drying to obtain the negatively charged cellulose nanofiber;

II. Preparation of a Positively Charged Cellulose Nanofiber adding 2,3-epoxypropyltrimethylammonium chloride and a wood pulp in a mass ratio of (0.1-10):1 to an organic solvent A, adding a certain amount of an alkaline substance B thereto, and subjecting the resulting mixture to a ring-opening reaction at a temperature of 50-90° C. for at least 2 hours; after the completion of reaction, repeatedly washing the resulting product mixture with deionized water to obtain the positively charged cellulose nanofiber;

(2) Preparation of an Ionic Waterborne Polyurethane firstly vacuum drying 30-80 parts by mass of a macromolecular diol at 110° C. for 1 hour, then cooling to 70° C., adding 20-40 parts by mass of a diisocyanate thereto, and subjecting the resulting mixture to a first polyaddition reaction for 1 hour under an anhydrous condition to obtain an isocyanate group-terminated polyurethane prepolymer; heating the resulting system containing the isocyanate group-terminated polyurethane prepolymer to 80° C., adding a tertiary amine group-containing (cation) or carboxyl group-containing (anion) diol monomer and a catalyst thereto, and subjecting the resulting mixture to a second polyaddition reaction for another 2-4 hours, during which a certain amount of an organic solvent C is added from time to time to regulate the viscosity of the mixture; adding a small molecular chain extender thereto, and subjecting the resulting mixture to a third polyaddition reaction for another 2-4 hours, cooling to 50° C., then adding an acid or alkaline substance D, which is equimolar with tertiary amine groups or carboxyl groups respectively, subjecting the resulting mixture to an acid-base neutralization for 30 minutes, finally dispersing the resulting product mixture in a certain amount of deionized water, and vacuum distilling to remove a residual solvent to obtain the ionic waterborne polyurethane dispersion; and (3) Preparation of a Pickering Foam and a Waterborne Polyurethane Foam Layer adding the charged cellulose nanofiber prepared in step (1) and a certain amount of a crosslinking agent to the waterborne polyurethane dispersion with an opposite charge in step (2), stirring the resulting mixture, forming a bimolecular layer at the gas/liquid interface by a self-assembly of the cellulose nanofiber and waterborne polyurethane nanoparticles through electrostatic interactions, to obtain a stable Pickering foam; leaving the stable Pickering foam standing at ambient temperature for a period of time until that the foam structure is cured by the crosslinking agent, and finally removing the solvent water to obtain a cationic waterborne polyurethane foam layer, i.e. the novel waterborne polyurethane foam layer for synthetic leather.

According to the method for preparing a waterborne polyurethane foam layer for synthetic leather, in some embodiments, the wood pulp used in step (1) is one selected from the group consisting of a refiner mechanical pulp, a sulfate wood pulp, a soda pulp, a sulfite wood pulp, a stone ground wood pulp, and a thermo-mechanical pulp. In some embodiments, the organic solvent A used is one selected from the group consisting of formamide, tetramethyl sulfoxide, acetonitrile, isopropanol, n-butanol, and tetrahydrofuran. In some embodiments, the alkaline substance B used is one selected from the group consisting of diethylamine, triethylamine, tripropylamine, diisopropylamine, trihexylamine, and sodium hydroxide.

According to the method for preparing a waterborne polyurethane foam layer for synthetic leather, in some embodiments, the diisocyanate used in step (2) is one selected from the group consisting of isophorone diisocyanate, 1,3-benzene diisocyanate, 2,6-toluene diisocyanate, hexamethylene diisocyanate, and 1,4-cyclohexane diisocyanate. In some embodiments, the macromolecular diol used is one or more selected from the group consisting of polytetramethylene ether glycol (PTMEG), polyethylene glycol, polycarbonate diol, polypropylene glycol, polysiloxanediol, and poly ε-caprolactone glycol. In some embodiments, the organic solvent C used is one selected from the group consisting of anhydrous tetrahydrofuran, and anhydrous acetone. In some embodiments, the hydrophilic monomer used is one selected from the group consisting of N-methyl diethanolamine, 3-dimethylamino-1,2-propylene glycol, diethanolamine, m-tolyl diethanolamine, N-butyl diethanolamine, bis(droxymethyl)propionic acid, bis(hydroxymethyl)butyric acid, tartaric acid, carboxyl monoester diol, diaminobenzoic acid, and ethylenediamino ethanesulfonic acid salt. In some embodiments, the small molecular chain extender used is one selected from the group consisting of lysine, 1,4-butanediol, 1,6-hexanediol, diethylene glycol, 1,4-butanediamine, ethylenediamine, and hydrazine. In some embodiments, the acid substance D used is one selected from the group consisting of acetic acid, propionic acid, benzoic acid, acrylic acid, and lactic acid.

According to the method for preparing a waterborne polyurethane foam layer for synthetic leather, in some embodiments, the crosslinking agent used in step (3) is one selected from the group consisting of aziridine, tri(hydroxymethyl) melamine, hexamethoxy methyl melamine, polycarbodiimide, epoxy resin, and triethylene tetramine.

In some embodiments, the catalyst is dibutyltin dilaurate.

Compared with the prior art, the present disclosure has the following beneficial effects, among other benefits:

1. The Pickering foam, which is synergistically stabilized by the cellulose nanofiber and waterborne polyurethane nanoparticles, has very good stability, and thus other auxiliaries such as a foam stabilizer, a thickener are not needed.

2. The waterborne polyurethane foam layer is prepared by using a Pickering foam that is synergistically stabilized by the cellulose nanofiber and waterborne polyurethane nanoparticles, as a template, which is simple and is suitable for industrial production. The prepared product has no flaws in appearance, and has a compact and regular foam structure, thereby well solving the problems of unstable pore size and poor uniformity of the waterborne polyurethane foam layer prepared by the existing mechanical foaming method.

3. The pore size of the foam is controllable, and foams with different pore sizes could be obtained by adjusting the surface wetability, concentration, and length-diameter ratio of the cellulose nanofiber.

4. The resulting waterborne polyurethane foaming layer could be cured at ambient temperature, and thus the energy consumption is low, thereby reducing the production cost.

DETAILED DESCRIPTION OF THE PREFERRED EMBODIMENTS

The four embodiments of the present disclosure are provided below to specifically illustrate the preparation of the waterborne polyurethane foam layer for synthetic leather.

Example 1

In this example, a waterborne polyurethane foam layer for synthetic leather was prepared according to the following steps:

(1) Preparation of an Anionic Cellulose Nanofiber 0.5 g of TEMPO and 5 g of NaBr were added to 20 g of a soda wood pulp (with a mass fraction of 15%). 80 ml of NaClO solution with a mass fraction of 37% was then slowly added thereto while stirring, during which 1 M NaOH solution was added continuously in the system to maintain a pH value of about 10. The resulting mixture was subjected to an oxidation reaction at ambient temperature until the pH value of the system no longer changed. The resulting product mixture was centrifugated. The supernatant solution was subjected to a dialysis and then freeze-dried, obtaining a carboxyl-containing anionic cellulose nanofiber.

(2) Preparation of a Cationic Waterborne Polyurethane

First, 10 g of (5 mmol) polycarbonate diol was dehydrated and dried under a reduced pressure at 110° C. for 1 hour. It was then cooled to 70° C. 5.77 g (26 mmol) of isophorone diisocyanate was added thereto under nitrogen. They were subjected to a first polyaddition reaction while stirring for 1 hour. 0.95 g (8 mmol) of N-methyl diethanolamine and three drops of dibutyltin dilaurate (catalyst) were then added. The resulting mixture was subjected to a second polyaddition reaction for another 2 hours. 1.08 g (12 mmol) of 1,4-butanediol was added thereto and the resulting mixture was subjected to a third polyaddition reaction for another 2 hours. The resulting product mixture was cooled to 50° C. 0.48 g (8 mmol) of acetic acid was then added thereto, and the resulting mixture was subjected to an acid-base neutralization reaction for half an hour. The finally resulting product mixture was poured into 42 g of deionized water, and they were stirred at a high speed for 30 minutes, obtaining a cationic waterborne polyurethane emulsion with a solid content of 30%.

(3) Preparation of a Pickering Foam and a Waterborne Polyurethane Foaming Layer 0.4 g of the carboxyl-containing anionic cellulose nanofiber and 0.6 g of tri(hydroxymethyl) melamine were added to 10 ml of the cationic waterborne polyurethane emulsion. They were emulsified for 2 minutes under the action of high-speed shear, obtaining a stable Pickering foam. The Pickering foam was then left standing at ambient temperature for 4 hours until the crosslinking and curing were completed. The cured product was transferred to an oven and vacuum dried therein at 80° C. to a constant weight, obtaining a waterborne polyurethane foam layer.

Example 2

In this example, a waterborne polyurethane foam layer for synthetic leather was prepared according to the following steps:

(1) Preparation of an Anionic Cellulose Nanofiber 0.6 g of TEMPO and 6 g of NaBr were added to 15 g of sulfate wood pulp (with a mass fraction of 15%). 90 ml of NaClO solution with a mass fraction of 37% was then slowly added thereto while stirring, during which 1 M NaOH solution was added continuously in the system to maintain a pH value of about 10. The resulting mixture was subjected to an oxidation reaction at ambient temperature until the pH value of the system no longer changed. The resulting product mixture was centrifugated. The supernatant solution was subjected to a dialysis and then freeze-dried, obtaining a carboxyl-containing anionic cellulose nanofiber.

(2) Preparation of a Cationic Waterborne Polyurethane

First, 14 g of (7 mmol) PTMEG was dehydrated and dried under a reduced pressure at 110° C. for 1 hour. It was then cooled to 70° C. 4.15 g (25 mmol) of 1,4-cyclohexane diisocyanate was added thereto under nitrogen. The resulting mixture was subjected to a first polyaddition reaction while stirring for 1 hour. 0.83 g (7 mmol) of 3-dimethyl-amino-1,2-propylene glycol and three drops of dibutyltin dilaurate (catalyst) were then added. The resulting mixture was subjected to a second polyaddition reaction for another 2 hours. 0.99 g (11 mmol) of 1,4-butanediol was added and the resulting mixture was subjected to a third polyaddition reaction for another 2 hours. The resulting product mixture was cooled to 50° C. 0.59 g (8 mmol) of propionic acid was then added thereto, and the resulting mixture was subjected to an acid-base neutralization reaction for half an hour. The finally resulting product mixture was poured into 46 g of deionized water, and they were stirred at a high speed for 30 minutes, obtaining a waterborne polyurethane emulsion with a solid content of 30%.

(3) preparation of a Pickering foam and a waterborne polyurethane foam layer 0.5 g of the carboxyl-containing anionic cellulose nanofiber and 0.5 g of hexamethoxymethyl melamine were added to 10 ml of the cationic waterborne polyurethane emulsion. They were emulsified for 2 minutes under the action of high-speed shear, obtaining a stable Pickering foam. The Pickering foam was then left standing at ambient temperature for 5 hours until the crosslinking and curing were completed. The cured product was transferred to an oven and vacuum dried therein at 80° C. to a constant weight, obtaining a waterborne polyurethane foam layer.

Example 3

In this example, a waterborne polyurethane foam layer for synthetic leather was prepared according to the following steps:

(1) Preparation of a Cationic Cellulose Nanofiber 5 g of 2,3-epoxypropyltrimethylammonium chloride was added to 10 g of a sulfate wood pulp (with a mass fraction of 20%). 2 mL of 1 M NaOH solution was then added to adjust the pH to alkaline. 100 ml of isopropanol solvent was then added thereto. The resulting mixture was subjected to a ring-opening reaction at 50° C. for 2 hours. After the reaction was completed, the resulting product mixture was washed multiple times with deionized water, obtaining the cationic cellulose nanofiber.

(2) Preparation of an Anionic Waterborne Polyurethane

First, 8 g of (4 mmol) polycarbonate diol was dehydrated and dried under a reduced pressure at 110° C. for 2 hours. It was then cooled to 75° C. 3.84 g (24 mmol) of 1,3-phenyldiisocyanate was added thereto under nitrogen. The resulting mixture was subjected to a first polyaddition reaction while stirring for 1 hour. 0.89 g (6 mmol) of dihydroxybutyric acid and three drops of dibutyltin dilaurate (catalyst) were then added thereto. The resulting mixture was subjected to a second polyaddition reaction for another 2 hours. 1.65 g (14 mmol) of 1,4-butanediol was added and the resulting mixture was subjected to a third polyaddition reaction for another 2 hours. The resulting product mixture was cooled to 50° C. 1.61 g (6 mmol) of triethylamine was then added thereto, and the resulting mixture was subjected to an acid-base neutralization reaction for half an hour. The finally resulting product mixture was poured into 37 g of deionized water, and they were stirred at a high speed for 30 minutes, obtaining a waterborne polyurethane emulsion with a solid content of 30%.

(3) Preparation of a Pickering Foam and a Waterborne Polyurethane Foam Layer 0.5 g of the cationic cellulose nanofiber and 0.4 g of aziridine were added to 10 mL of the anionic waterborne polyurethane emulsion. They were emulsified for 2 minutes under the action of high-speed shear, obtaining a stable Pickering foam. The Pickering foam was then left standing at ambient temperature for 5 hours until the crosslinking and curing were completed. The cured product was transferred to an oven and vacuum dried therein at 80° C. to a constant weight, obtaining a waterborne polyurethane foam layer.

Example 4

In this example, a waterborne polyurethane foam layer for synthetic leather was prepared according to the following steps:

(1) Preparation of a Cationic Cellulose Nanofiber 8 g of 2,3-epoxypropyltrimethylammonium chloride was added to 10 g of a refiner mechanical pulp (with a mass fraction of 25%). 2 mL of 1 M sodium hydroxide solution was added to adjust the pH value of the system to alkaline. 100 mL of n-butanol solvent was added thereto. The resulting mixture was subjected to a ring-opening reaction at 65° C. for 3 hours. After the reaction was completed, the resulting product mixture was washed multiple times with deionized water, obtaining the cationic cellulose nanofiber.

(2) Preparation of an Anionic Waterborne Polyurethane

First, 14 g (7 mmol) of polysiloxane diol was dehydrated and dried under a reduced pressure at 110° C. for 2 hours. It was cooled to 80° C. 3.98 g (26 mmol) of 1,4-cyclohexane diisocyanate was added thereto under nitrogen. The resulting mixture was subjected to a first polyaddition reaction while stirring for 1 hour. 0.9 g (6 mmol) of tartaric acid and three drops of dibutyltin dilaurate (catalyst) were then added thereto. The resulting mixture was subjected to a second polyaddition reaction for another 2 hours. 1.90 g (13 mmol) of lysine was added thereto and the resulting mixture was subjected to a third polyaddition reaction for another 2 hours. The resulting product mixture was cooled to 50° C. 1.08 g (12 mmol) of triethylamine was added thereto, and the resulting mixture was subjected to an acid-base neutralization reaction for half an hour. The finally resulting product mixture was poured into 49 g of deionized water, and they were stirred at a high speed for 30 minutes, obtaining a waterborne polyurethane emulsion with a solid content of 30%.

(3) Preparation of a Pickering Foam and a Waterborne Polyurethane Foaming Layer 0.6 g of the cationic cellulose nanofiber and 0.5 g of polycarbodiimide were added to 10 ml of the anionic waterborne polyurethane emulsion. They were emulsified for 2 minutes under the action of high-speed shear, obtaining a stable Pickering foam. The Pickering foam was then left standing at ambient temperature for 5 hours until the crosslinking and curing were completed. The cured product was transferred to an oven and vacuum dried therein at 80° C. to a constant weight, obtaining a waterborne polyurethane foam layer.

What is claimed is:

1. A method for preparing a waterborne polyurethane foam layer for synthetic leather, the method comprising:

(1) preparing a charged cellulose nanofiber, comprising:
   I. preparing a negatively charged cellulose nanofiber, including
      mixing 100 parts by mass of a pulp containing 60% by mass of a wood pulp fiber, 1-10 parts by mass of 2,2,6,6-tetramethylpiperidin-1-oxyl (TEMPO), and 10-60 parts by mass of NaBr to be uniform, adding 20-120 parts by mass of a solution of sodium hypochlorite with a mass fraction of 37% thereto while stirring, and subjecting the resulting mixture to an oxidation reaction at a pH value of 8-10; after the completion of the reaction, centrifugating the resulting product mixture to obtain a supernatant solution, subjecting the supernatant solution to a dialysis, and freeze-drying to obtain the negatively charged cellulose nanofiber;
   II. preparing a positively charged cellulose nanofiber, including
      adding 2,3-epoxypropyltrimethylammonium chloride and a wood pulp in a mass ratio of (0.1-10):1 to an organic solvent A, adding a certain amount of an alkaline substance B thereto, and subjecting the resulting mixture to a ring-opening reaction at a temperature of 50-90° C. for at least 2 hours; after the completion of the reaction, repeatedly washing the resulting product mixture with deionized water to obtain the positively charged cellulose nanofiber;

(2) preparing an ionic waterborne polyurethane, including vacuum drying 30-80 parts by mass of a macromolecular diol at 110° C. for 1 hour, then cooling to 70° C., adding 20-40 parts by mass of a diisocyanate thereto, and subjecting the resulting mixture to a first polyaddition reaction for 1 hour under an anhydrous condition to obtain an isocyanate group-terminated polyurethane prepolymer; heating the resulting system containing the isocyanate group-terminated polyurethane prepolymer to 80° C., adding a tertiary amine group-containing (cation) or carboxyl group-containing (anion) diol monomer and a catalyst thereto, and subjecting the resulting mixture to a second polyaddition reaction for another 2-4 hours, during which a certain amount of an organic solvent C is added from time to time to regulate the viscosity of the mixture; adding a small molecular chain extender thereto, and subjecting the resulting mixture to a third polyaddition reaction for another 2-4 hours, cooling to 50° C., then adding an acid or alkaline substance D, which is equimolar with tertiary amine groups or carboxyl groups respectively, subjecting the resulting mixture to an acid-base neutralization reaction for 30 minutes, finally dispersing the resulting product mixture in a certain amount of deionized water, and vacuum distilling to remove a residual solvent to obtain the ionic waterborne polyurethane dispersion; and (3) preparing a Pickering foam and a waterborne polyurethane foam layer, including
   adding the charged cellulose nanofiber prepared in step (1) and a certain amount of a crosslinking agent to the waterborne polyurethane dispersion with an opposite charge in step (2), stirring the resulting mixture, forming a bimolecular layer at the gas/liquid interface by a self-assembly of the cellulose nanofiber and waterborne polyurethane nanoparticles through electrostatic interactions, to obtain a stable Pickering foam; leaving the stable Pickering foam standing at ambient temperature for a period of time until that the foam structure is cured by the crosslinking agent, and finally removing the solvent water to obtain a cationic waterborne polyurethane foam layer.

2. The method for preparing a novel waterborne polyurethane foam layer for synthetic leather as claimed in claim 1, wherein in step (1), the wood pulp used is one selected from the group consisting of a refiner mechanical pulp, a sulfate wood pulp, a soda pulp, a sulfite wood pulp, a stone ground wood pulp, and a thermo-mechanical pulp; the organic solvent A used is one selected from the group consisting of formamide, tetramethyl sulfoxide, acetonitrile, isopropanol, n-butanol, and tetrahydrofuran; the alkaline substance B used is one selected from the group consisting of diethylamine, triethylamine, tripropylamine, diisopropylamine, trihexylamine, and sodium hydroxide.

3. The method for preparing a novel waterborne polyurethane foam layer for synthetic leather as claimed in claim 1, wherein in step (2), the diisocyanate used is one selected from the group consisting of isophorone diisocyanate, 1,3-benzene diisocyanate, 2,6-toluene diisocyanate, hexamethylene diisocyanate, and 1,4-cyclohexane diisocyanate; the macromolecular diol used is one or more selected from the group consisting of polytetramethylene ether glycol, polyethylene glycol, polycarbonate diol, polypropylene glycol, polysiloxanediol, and poly E-caprolactone glycol; the organic solvent C used is one selected from the group consisting of anhydrous tetrahydrofuran, and anhydrous acetone; the hydrophilic monomer used is one selected from the group consisting of N-methyl diethanolamine, 3-dimethylamino-1,2-propylene glycol, diethanolamine, m-tolyl diethanolamine, N-butyl diethanolamine, bis(droxymethyl) propionic acid, bis(hydroxymethyl)butyric acid, tartaric acid, carboxyl monoester diol, diaminobenzoic acid, and ethylenediamino ethanesulfonic acid salt; the small molecular chain extender used is one selected from the group consisting of lysine, 1,4-butanediol, 1,6-hexanediol, diethylene glycol, 1,4-butanediamine, ethylenediamine, and hydrazine; the acid substance D used is one selected from the group consisting of acetic acid, propionic acid, benzoic acid, acrylic acid, and lactic acid.

4. The method for preparing a waterborne polyurethane foam layer for synthetic leather as claimed in claim 1, wherein the crosslinking agent used in step (3) is one selected from the group consisting of aziridine, tri(hydroxymethyl) melamine, hexamethoxy methyl melamine, polycarbodiimide, epoxy resin, and triethylene tetramine.

5. The method for preparing a waterborne polyurethane foam layer for synthetic leather as claimed in claim 1, wherein the catalyst is dibutyltin dilaurate.

* * * * *